United States Patent [11] 3,627,795

[72] Inventors Horst Pommer
Ludwigshafen;
Axel Nuerrenbach, Gruenstadt; Georg
Klotmann, Ludwigshafen; Hans Grassner,
Heidelberg, all of Germany
[21] Appl. No. 19,753
[22] Filed Mar. 16, 1970
[45] Patented Dec. 14, 1971
[73] Assignee Badische Anilin- & Soda-Fabrik
Aktiengesellschaft
Ludwigshafen am Rhine, Germany
[32] Priority Mar. 19, 1969
[33] Germany
[31] P 19 13 847.7

[54] CONTINUOUS PRODUCTION OF VITAMIN A PALMITATE
12 Claims, 1 Drawing Fig.

[52] U.S. Cl. .................................................. 260/410
[51] Int. Cl. .................................................. C07c 175/00
[50] Field of Search.................................... 260/410,
488 A, 410.9 V

[56] References Cited
UNITED STATES PATENTS
2,712,515 7/1955 Beutel .......................... 424/312

Primary Examiner—Lewis Gotts
Assistant Examiner—Diana G. Rivers
Attorney—Johnston, Root, O'Keeffe, Keil, Thompson and Shurtleff ABSTRACT: Vitamin A palmitate is prepared from vitamin A alcohol and palmitoyl chloride in the presence of a tertiary amine in a continuous process in which vitamin A palmitate is obtained in high purity and almost quantitative yields.

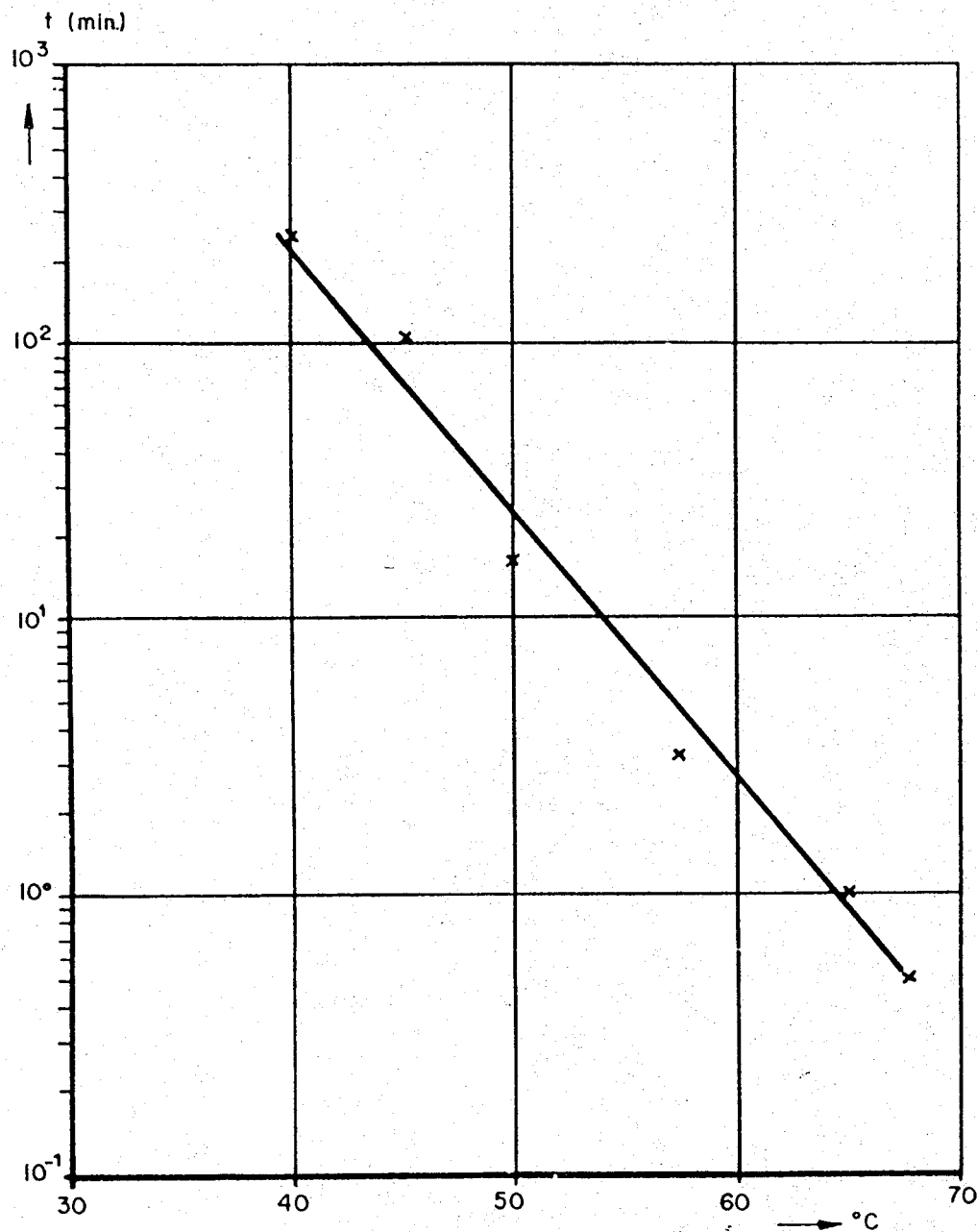
INVENTORS:
HORST POMMER
AXEL NUERRENBACH
GEORG KLOTMANN
HANS GRASSNER

CONTINUOUS PRODUCTION OF VITAMIN A PALMITATE

This invention relates to a continuous process for the production of vitamin A palmitate from vitamin A alcohol and palmitoyl chloride (palmitic acid chloride).

It is known that carboxylic esters can be prepared by the action of an acid chloride on an alcohol, the reaction advantageously being carried out in the presence of a base to ensure rapid and complete reaction (Houben-Weyl, fourth edition, volume 8, pages 543 and 547). According to this method vitamin A palmitate can be prepared from vitamin A alcohol and palmitoyl chloride in the presence of an organic base such as pyridine or triethylamine.

In carrying out this method a number of difficulties is encountered, especially on an industrial scale. The major cause of these difficulties is the high instability of vitamin A alcohol and—to a lesser degree—vitamin A palmitate which is readily destroyed with the formation of anhydro-vitamin A and retro-vitamin A, especially under the influence of acid media. Yield, quality and color number of vitamin A palmitate are also detrimentally affected particularly by long residence times of the reactants and the end product at elevated temperature, unsatisfactory mixing of the reaction components such as may be caused by the precipitating hydrochloride of the base, and local overheating during the exothermic reaction.

The said and other difficulties are practically insuperable in the batchwise method, while the slow rate of reaction of vitamin A alcohol with palmitoyl chloride in the presence of an amine at temperatures below 40° C. (see the graph in the drawing) militates against continuous operation. To carry out the process continuously equipment of large dimensions is necessary owing to the long residence times, and satisfactory mixing of the heterogeneous reaction mixture and reliable withdrawal of the heat of reaction are not guaranteed. When using a temperature above 40° C., in which the reaction of vitamin A alcohol with palmitoyl chloride in the presence of a tertiary amine proceeds more rapidly, as may be seen from the drawing, deterioration in quality and decrease in yield would have been expected from previous experience.

If vitamin A alcohol is heated in the presence of triethylammonium chloride (molar ratio 1:1) in hexane to 50° C., some of the vitamin A alcohol degrades into anhydro-vitamin A after only 10 minutes. This degradation can be detected in the absorption spectrum by the occurrence and increase in an absorption band at 392 millimicrons in addition to the decrease in the absorption in the maximum of the vitamin A alcohol at 328 millimicrons. The decomposition may also be detected chromatographically. After another 20 minutes (i.e. a total of 30 minutes) the vitamin A alcohol is substantially destroyed.

Although vitamin A palmitate is more stable than vitamin A alcohol under the same conditions, there is an appreciable decomposition here also after 10 minutes. After 40 minutes about 25 percent of the original vitamin A palmitate has been destroyed. This can be followed by changes in the absorption in the maximum at 328 millimicrons.

We have now found that vitamin A palmitate is obtained in higher purity and almost quantitative yield by contacting the vitamin A alcohol and palmitoyl chloride continuously in the presence of a tertiary amine in a substantially constant ratio in the temperature range from 40° to 65° C., but preferably at about 65° C., removing the reaction mixture continuously from the point at which the reactants have been brought together and working it up after a maximum residence time of 15 minutes.

The preferred constant ratio of vitamin A alcohol to palmitoyl chloride is from 1:1 to 1:1.5 equivalents. The reaction is advantageously carried out in a solvent which is inert under the reaction conditions such as hexane, heptane, octane, nonane, a suitable gasoline fraction, methylene chloride or chloroform or a mixture of two or more of these solvents. Instead of solutions of the reactants, they may themselves be combined with each other. Preferred tertiary amines are triethylamine, tripropylamine, tributylamine, pyridine and picoline or mixtures of the same. They are advantageously used in amounts of 1.2 to 1.6 equivalents with reference to palmitoyl chloride.

The tertiary amines may be liquid or solid. In the latter case they should however be at least partly soluble, for example soluble to the extent of from 5 to 10 percent, in the solvent used. It is presupposed in every case that the tertiary amine is sufficiently basic to act as a proton acceptor with respect to the hydrogen chloride liberated in the reaction.

This is the case when the tertiary amine used has a $pk_a$ value in aqueous solution at 20° C. of at least 4 and preferably of from 5 to 12.

In carrying out the process according to this invention it is advantageous to achieve efficient mixing in the reaction vessel used.

Increase in the rate of reaction when working in the said temperature range (and the resultant increase in the space-time yield) permits the reaction being carried out in reaction vessels having small dimensions, enabling optimum mixing of the reactants to be achieved. Various apparatus and equipment, as for example nozzles, stirred reactors and recirculation systems, are suitable for the purpose.

One embodiment consists in contacting the reactants by means of a stirred reactor. The reactants flow through a stirred container whose volume is adapted to the required residence time and in which a strongly turbulent flow is produced by means of stirring means and baffles. The reactants are advantageously fed in through a dip tube to near to the bottom of the reactor. The heat of reaction may be withdrawn by installed cooling coils or by a cooling jacket provided on the reactor. The level of the liquid in the reactor is maintained by means of a lateral outlet tube at the appropriate height or by means of a siphon.

The amount of reactants is adjusted so that the residence time in the reactor which is necessary for the reaction is obtained. The reaction is advantageously carried out so that the residence time in the reactor is from 3 to 8 minutes and the reaction mixture is then passed through a dwell zone heated to about 60° C. through which the mixture takes about 3 minutes to pass and in which unreacted remainders of vitamin A alcohol are converted into palmitate.

In another embodiment, a recirculation system can be used. In this case the reactants are introduced into the circulating reaction mixture and at the same time an appropriate amount of mixture which has been substantially reacted is withdrawn. A strongly turbulent flow is maintained in the system by a circulating pump or by injecting inert gas. The mixture leaving the system may pass through an after reaction chamber in which it remains for a definite time so that reaction is completed.

In another embodiment the reactants are brought together by means of one or more nozzles. For example a mixture of vitamin A alcohol, tertiary amine and solvent (if used) may be passed through a tube in the interior of which a nozzle is located through which palmitoyl chloride is passed. The diameter of the tube, the shape of the nozzle and the outflow rate are correlated so that optimum mixing of the reactants is achieved without any addition mechanical measures. This may be achieved for example by constricting the outlet from the tube supplying palmitoyl chloride to about one-seventh of its original diameter so that the rate of flow is increased to about 2 meters per second. The tubular reactor has a diameter which is about 20 times the size of the outlet opening of the tube supplying palmitoyl chloride. To provide better mixing, six staggered baffles are located in the tubular reactor about 50 cm. downstream of the nozzle which constrict the diameter of the tube to about one-eighth of the original diameter. This arrangement permits rapid and complete mixing and reaction even at high throughputs of about 2 liters per hour per $cm.^2$ of reactor cross section, equivalent to 8 to 9 kg. of vitamin A palmitate per hour per $cm.^2$. If necessary the reaction mixture may again pass through an afterreaction chamber or enter into a dwell zone through which it flows in plug flow. Heat of reaction may be withdrawn by external cooling, evaporative cooling or by introduction of cooled solvent.

Since at 60° to 65° C. and under the said reaction conditions the residence time is less than 10 minutes, a relatively small reactor is required for the production of a large amount of vitamin A palmitate. Thus from 180 to 190 kg. per hour of vitamin A palmitate can be prepared in the reaction solution in a reaction volume of 100 liters. The reaction mixture is then continuously worked up by a conventional method.

A small reactor has great advantages as regards mixing of the reactants, withdrawal of heat of reaction and the easier temperature control associated therewith.

It is preferred to use an atmosphere of protective gas, for example nitrogen.

The following example illustrates the invention. The parts specified are by weight. Parts by weight bear the same relation to parts by volume as the gram to the liter.

EXAMPLE

A mixture of 1,144 parts of vitamin A alcohol, 535 parts of triethylamine and 2,000 parts of hexane which has been preheated to 55° C. is continuously brought into contact per hour in a stirred reactor having a capacity of 1.8 parts by volume with 1,220 parts of palmitoyl chloride which has also been preheated to 55° C. The reaction mixture heats up to about 65° C. Strong turbulence is set up in the stirred reactor by means of a stirrer and by means of stationary mixing means. The level of the reaction mixture is kept at 0.6 part by volume in the reactor by means of a siphon. The mixture leaving the reactor passes into an attached dwell zone whose volume is such that the residence time therein is 2 minutes. Completion of the reaction takes place here. The pasty reaction mixture passes into an extractor and is continuously freed therein from triethylamine hydrochloride by adding 2,700 parts per hour of 2 percent sulfuric acid countercurrent at 60° C. The vitamin A palmitate solution in hexane is then freed from a small amount of impurities by continuous crystallization at room temperature and filtration. After the filtrate has been evaporated, 2,085 parts of vitamin A palmitate is obtained per hour. Vitamin A alcohol can no longer be detected therein by thin layer chromatography. The product has a pale yellow color. Ultraviolet spectroscopic measurement shows that the yield is practically quantitative ($\lambda_{max}$ 327 to 328 millimicrons; 1.78 Mio JE/g).

In batchwise operation only 1,850 parts of vitamin A palmitate is obtained from 1,144 parts of vitamin A alcohol. The product has a dark brown color. Ultraviolet measurement shows that the vitamin A palmitate is seriously contaminated ($\lambda_{max}$ 327 to 328 millimicrons; 1.61 Mio JE/g). The yield is only 78 percent of the yield in the continuous method.

We claim:

1. A process for the production of vitamin A palmitate from vitamin A alcohol and palmitoyl chloride in the presence of a tertiary amine, wherein the reactants are brought together in substantially constant proportions in a temperature range of from 40° to 65° C. in the presence of a solvent which is inert under the reaction conditions, and the reaction mixture is continuously removed from the zone in which the reactants have been brought together and is worked up after a residence time of not more than 15 minutes.

2. A process as claimed in claim 1 wherein hexane, heptane, octane, nonane, appropriate gasoline fractions, methylene chloride or chloroform or a mixture of two or more of these solvents is used as the inert solvent.

3. A process as claimed in claim 1 wherein the vitamin A alcohol and the palmitoyl chloride are used in a molar ratio of 1:1 to 1:1.5.

4. A process as claimed in claim 2 wherein the vitamin A alcohol and the palmitoyl chloride are used in a molar ration of 1:1 to 1:1.5.

5. A process as claimed in claim 1 wherein from 1.2 to 1.6 equivalents of tertiary amine is used with reference to palmitoyl chloride.

6. A process as claimed in claim 3 wherein 1.2 to 1.6 equivalents of tertiary amine is used with reference to palmitoyl chloride.

7. A process as claimed in claim 1 wherein the tertiary amine used is triethylamine, tripropylamine, tributylamine, pyridine, picoline or mixtures thereof.

8. A process as claimed in claim 6 wherein triethylamine, tripropylamine, tributylamine, pyridine or picoline or a mixture thereof is used as the tertiary amine.

9. A process as claimed in claim 1 wherein the temperature after the reactants have been brought together is about 65° C.

10. A process as claimed in claim 3 wherein the temperature after the reactants have been brought together is about 65° C.

11. A process as claimed in claim 8 wherein the temperature after the reactants have been brought together is about 65° C.

12. A process as claimed in claim 1 wherein the reactants are brought together in a stirred reactor, in a mixing nozzle or in a recirculation system.

* * * * *